US012633515B2

(12) United States Patent　　　(10) Patent No.:　US 12,633,515 B2
Hosein et al.　　　　　　　　　　(45) Date of Patent:　May 19, 2026

(54) PROCESS FOR CONVERTING AVOCADO PEEL INTO HARD CARBON POWDER USEFUL FOR BATTERY ANODES

(71) Applicants: Ian D. Hosein, Minoa, NY (US); Francielli Genier, Syracuse, NY (US); Shreyas Pathreeker, Philadelphia, PA (US)

(72) Inventors: Ian D. Hosein, Minoa, NY (US); Francielli Genier, Syracuse, NY (US); Shreyas Pathreeker, Philadelphia, PA (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 597 days.

(21) Appl. No.: 18/116,267

(22) Filed: Mar. 1, 2023

(65) Prior Publication Data

US 2023/0282803 A1　　Sep. 7, 2023

Related U.S. Application Data

(60) Provisional application No. 63/315,309, filed on Mar. 1, 2022.

(51) Int. Cl.
*H01M 4/04*　　　(2006.01)
*H01M 4/583*　　(2010.01)
*H01M 10/24*　　(2006.01)

(52) U.S. Cl.
CPC ......... *H01M 4/0471* (2013.01); *H01M 4/583* (2013.01); *H01M 10/24* (2013.01)

(58) Field of Classification Search
CPC .... H01M 4/0471; H01M 4/583; H01M 10/24; H01M 4/587; Y02E 60/10
See application file for complete search history.

(56) References Cited

PUBLICATIONS

Palma, et al. Production of carbonaceous materials from avocado peel for its application as alternative adsorbent for dyes removal, Chinese Journal of Chemical Engineering 2016; 24: 521-528 (Year: 2016).*

Muruganantham, et al., Biomass Feedstock of Waste Mango-Peel Derived Porous Hard Carbon for Sustainable High-Performance Lithium-Ion Energy Storage Devices, Energy Fuels 2021; 35: 10878-10889 with Supporting Information (Year: 2021).*

* cited by examiner

*Primary Examiner* — Daniel C. McCracken
(74) *Attorney, Agent, or Firm* — David L. Nocilly; Bond Schoeneck & King PLLC

(57) ABSTRACT

A process for converting avocado peels into hard carbon-based anodes for sodium ion batteries and a hard carbon material formed according to that process. The avocado peels are simply washed and dried, and then carbonized using a high temperature conversion step. Electrochemical measurements confirmed the applicability of avocado-derived hard carbon as electrode active materials, with high reversible capacities of 320 mAh/g over 50 cycles at 50 mA/g, good rate performance of 86 mAh/g at 3500 mA/g, and Coulombic efficiencies above 99.9% after 500 cycles.

17 Claims, 7 Drawing Sheets

10

12 — COLLECT AVOCADO PEELS

14 — REMOVE ANY PULP WITH DEIONIZED WATER AND DRY AT 115 °C OVERNIGHT

16 — ROUGHLY GRIND PEELS AND WASH WITH DEIONIZED WATER AT 50 °C

18 — DRY AT 115 °C OVERNIGHT

20 — CARBONIZE IN ALUMINUM CRUCIBLE AT 900 to 1100 °C FOR 2 HOURS UNDER ARGON FLOW AT HEATING RATE OF 5 °C/min

22 — GRIND AND FORM CARBONIZED MATERIAL FOR USE AS ELECTRODE

PROCESS FOR CONVERTING AVOCADO PEEL INTO HARD CARBON POWDER USEFUL FOR BATTERY ANODES

CROSS-REFERENCE TO RELATED APPLICATIONS

The present application claims priority to U.S. Provisional No. 63/315,309 filed on Mar. 1, 2022.

STATEMENT REGARDING FEDERALLY SPONSORED RESEARCH OR DEVELOPMENT

This invention was made with government support under Award No. CMMI-1751621 awarded by the National Science Foundation. The government has certain rights in the invention.

BACKGROUND OF THE INVENTION

1. Field of the Invention

The present invention relates to hard carbon production and, more specifically, to an approach for making hard carbon from avocado waste.

2. Description of the Related Art

The high demand for lithium-ion batteries has triggered significant research interest in finding alternative ion carriers. Sodium is a great candidate due to its similar physico-chemical properties to lithium, high abundance on earth's crust, and lower cost of most active materials. However, simply transferring lithium battery technologies to sodium conduction is hampered by differences in intercalation mechanisms and ionic radius. Notably, graphite, an established anode material of lithium-ion batteries, cannot be simply applied to sodium-ion batteries. The reason is the interlayer distance between the graphene sheets are too small, namely 0.34 nm, for effective $Na^+$ insertion.

Suitable alternatives to pure graphite include disordered carbon materials due to its usually higher interlayer distances (>0.37 nm) and defect-rich structures. Hard carbon, in particular, is especially environmentally and economically advantageous since it is predominately produced by biomass and residues, including fruit peels and nut shells. However, the methodology of obtaining hard carbon could be detrimental to its economic and environmental impact, remarkably due to activation steps and high carbonization temperatures. The activation method usually consists of soaking the precursor source in an alkaline or acid solution before carbonization with the aim to modify the porosity and surface properties of the hard carbon. If transposed to industrial scale, this extra step could translate into additional costs from washing and residue neutralization. Moreover, few reports have shown workable capacities with hard carbon obtained with carbonization temperatures below 1200° C., and high pyrolyzation temperatures signify a considerable energy demand.

The global demand for avocados has increased exponentially since the 1990s. Each year, an estimation of 5 million tons of avocados are consumed globally. 85% of the total production corresponds to the Hass variety due to its buttery consistency and thick protective skin—which facilitates trade. In the United States, the avocado market has grown 16% every year since 2008 and was the 8th most consumed fruit/vegetable in 2019, partially due to potential health advantages and lifestyle trends among millennials and, more recently, Gen Z individuals. Sold raw or industrially processed, avocados generate waste from their peels, seeds, and even oxidized parts of the pulp. Depending on the species, avocado industrial processing can produce up to 30% of its weight in solid waste.

Accordingly, there is a need for a sustainable approach that can use avocado industrial processing waste for the production of hard carbon without the need for harsh chemical treatments and extremely high temperatures.

BRIEF SUMMARY OF THE INVENTION

The present invention decreases the environmental impact of hard carbon production while also obtaining a suitable active material for sodium-ion intercalation. More specifically, hard carbon was produced from avocado peels by carbonization at 900 and 1100° C. after simply washing the peels with deionized (DI) water. The method commenced with an amount of avocado peels, which were cleaned with deionized water and dried. The avocado peels were carbonized at a temperature of at least 900 degrees Celsius for a predetermined amount of time and then ground an amount of hard carbon. The step of carbonizing the amount of avocado peels was performed under an argon gas flow at a heating rate of 5 degrees Celsius per minute. The predetermined amount of time was about two hours. One preferred temperature for carbonizing is 1100 degrees Celsius. The method may include the step of removing any pulp from the amount of avocado peels prior to the step of carbonizing the amount of avocado peels as well as the step of drying the amount of avocado peels at 115 degrees Celsius after the step of removing any pulp from the amount of avocado peels. The method ma additionally include the step of grinding the amount of avocado peels after the step of drying the amount of avocado peels at 115 degrees Celsius. The method may further include the step of washing the amount of avocado peels with deionized water after the steps of grinding the amount of avocado peels and drying the amount of avocado peels at 115 degrees Celsius. The method may also include the step of drying the amount of avocado peels at 115 degrees Celsius after the step of washing the amount of avocado peels with deionized water after the steps of grinding the amount of avocado peels and drying the amount of avocado peels at 115 degrees Celsius.

In another embodiment, the present invention is a hard carbon material formed from an amount of carbonized avocado peels. The hard carbon material has a graphene interlayer distance greater than 3.7 and, more specifically, a graphene interlayer distance between 3.95 and 4.07 Å. The hard carbon material has a carbon percentage between 84.85 percent and 92.68 percent. The hard carbon material has a reversible capacity of 352.55 mAh/g at 0.05 A/g when provided as an electrode. The hard carbon material has a rate capability of 86 mAh/g at 3500 mA/g when provided as an electrode. The hard carbon material has a 99.9% Coulombic efficiency after 500 cycles when provided as an electrode. As a result, hard carbon material produced from avocado peels according to the present invention showed proper graphene interlayer distance, high carbon content, and microporosity that is beneficial to intercalation and electrolyte penetration. The hard carbon-based electrodes exhibited a great reversible capacity of 352.55 mAh/g at 0.05 A/g. Rate capabilities of 86 mAh/g at 3500 mA/g were also achieved, as well as 99.9% Coulombic efficiencies after 500 cycles.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
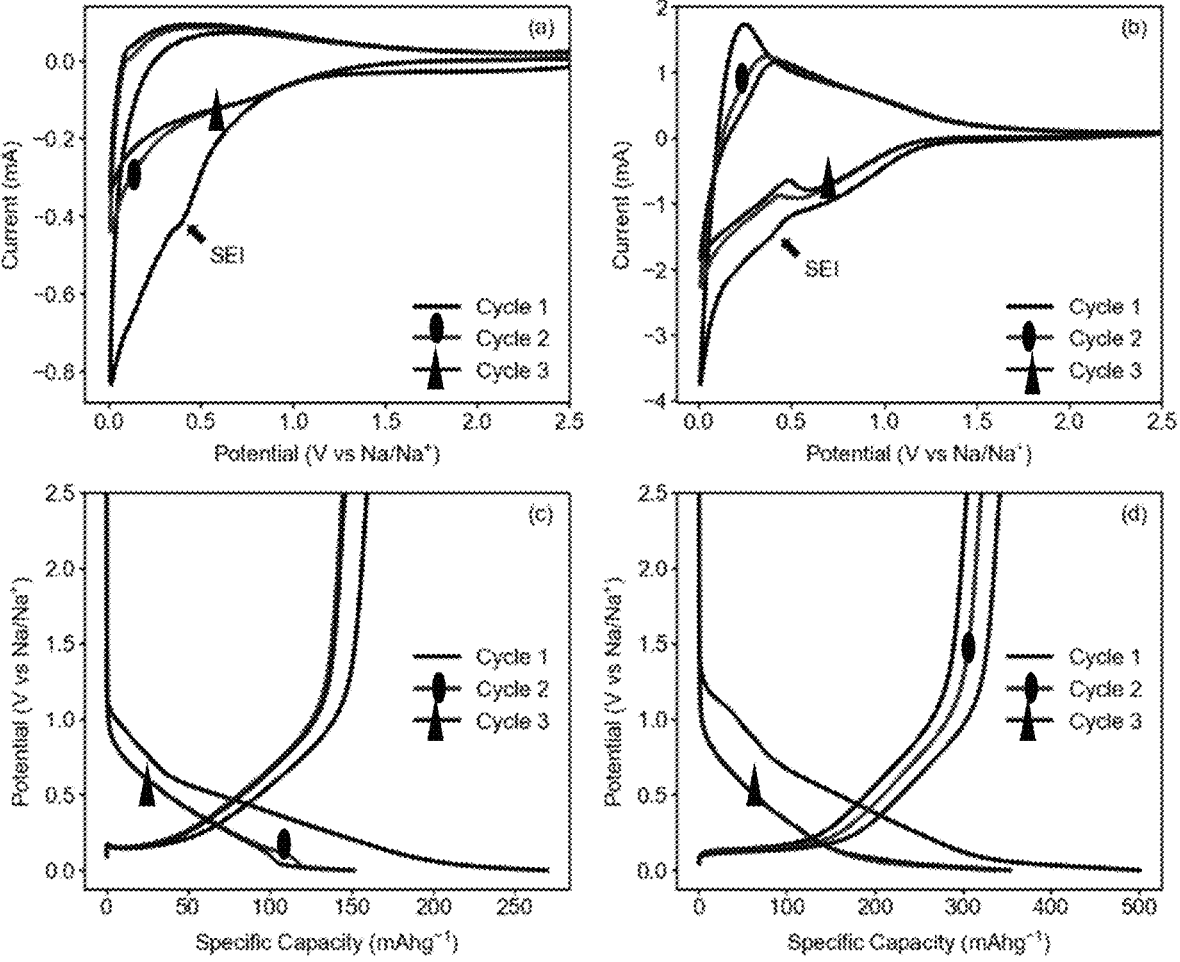

FIG. 4 is a series of graphs of the electrochemical measurements of avocado-peel derived hard carbon anodes. Cyclic voltammetry at 0.25 mV s$^{-1}$ of coin cells with sodium metal cathode, and 0.8 M NaClO4 in DEC:EC+FEC (1:1+ 5% vol.), and hard carbon anode produced from (a) HC-900 and (c) HC-1100. Galvanostatic charge/discharge profiles of half-cells with same configuration and hard carbon anodes from (b) HC-900 and (d) HC-1100. The first three cyclic voltammetry and galvanostatic cycles are displayed.

Figure 5:
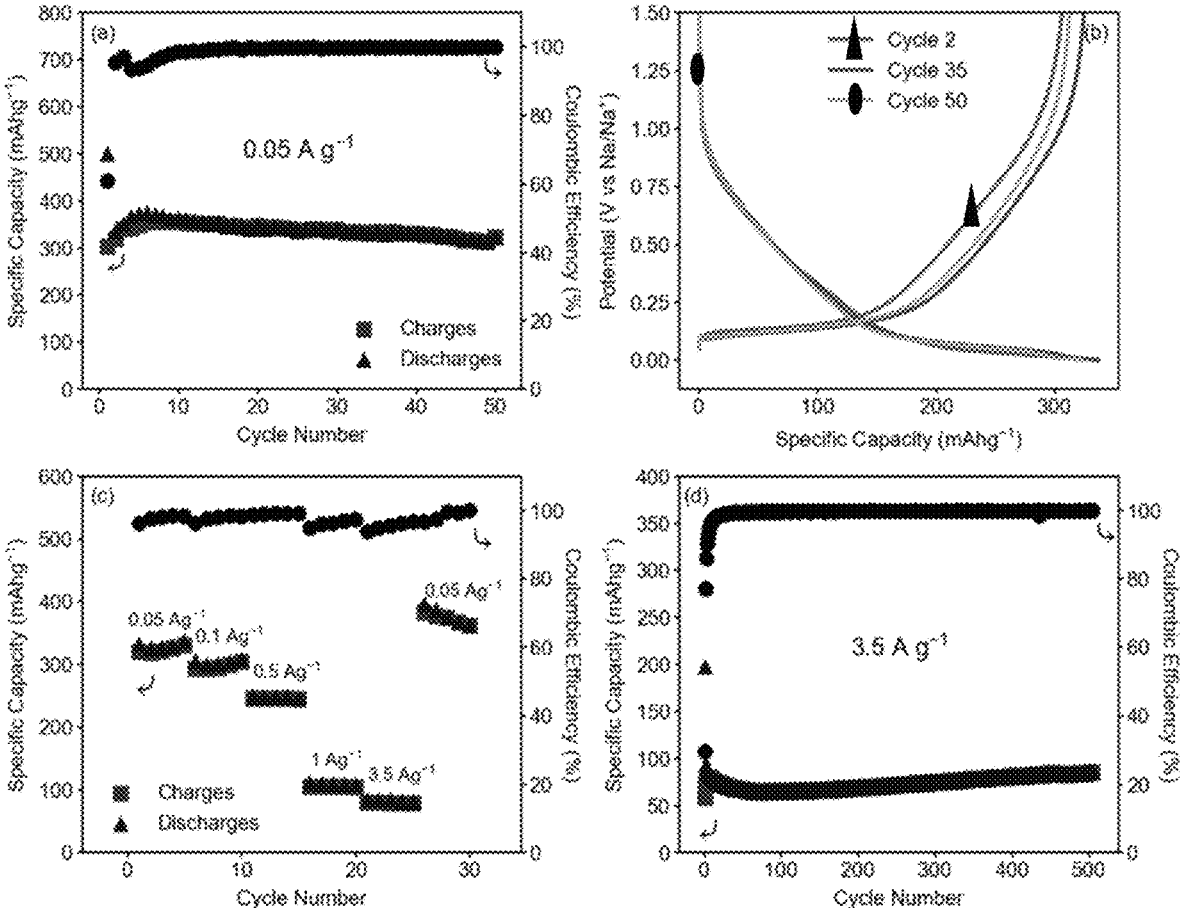

FIG. 5 is a series of graphs of battery cycling studies as follows: (a) Galvanostatic charge/discharge capacities and coulombic efficiencies of CR2032 cells with a sodium metal cathode, and 0.8 M NaClO4 in DEC:EC+FEC (1:1+5% vol.) as electrolyte, and hard carbon anode produced from HC-1100, with the measurements were collected using a current rate of 0.05 A g$^{-1}$; (b) Galvanostatic profiles of 1$^{st}$, 21$^{st}$ and 36$^{th}$ cycles of same sodium half-cell as in item (a); (c) Rate performance and coulombic efficiencies of sodium half-cell under different current rates; and (d) Galvanostatic charge/discharge capacities and coulombic efficiencies collected at 3.5 A g$^{-1}$.

Figure 6:
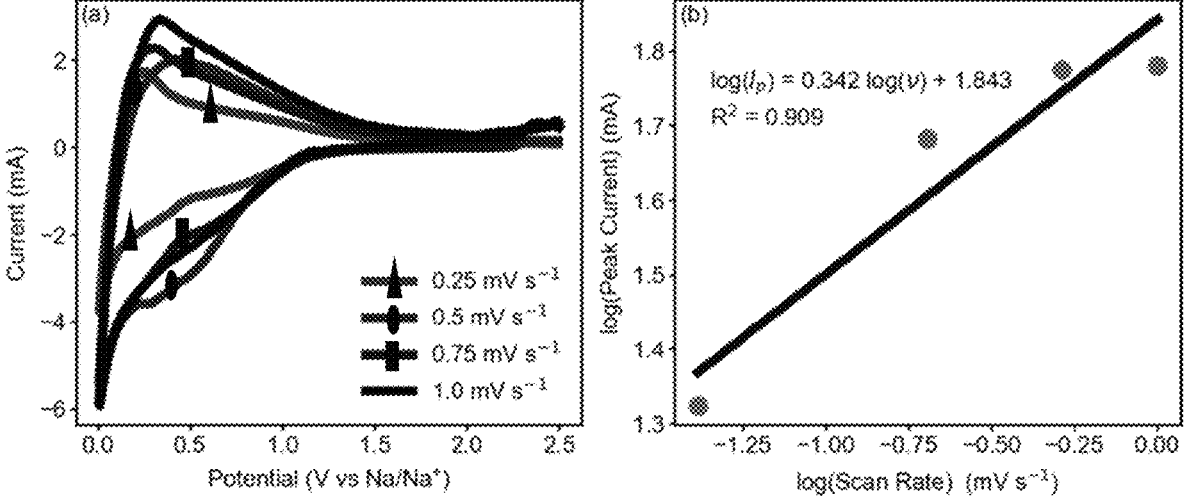

FIG. 6 is a pair of graphs of diffusion kinetics of HC-1100 electrodes as follows: (a) Cyclic voltammetry (CV) curves at various scan rate (from 0.1 mV s−1 to 1 mV s−1) of HC-1100; (b) Linear fitting of the plots between log(ip) and log(v).

DETAILED DESCRIPTION OF THE INVENTION

Figure 1:
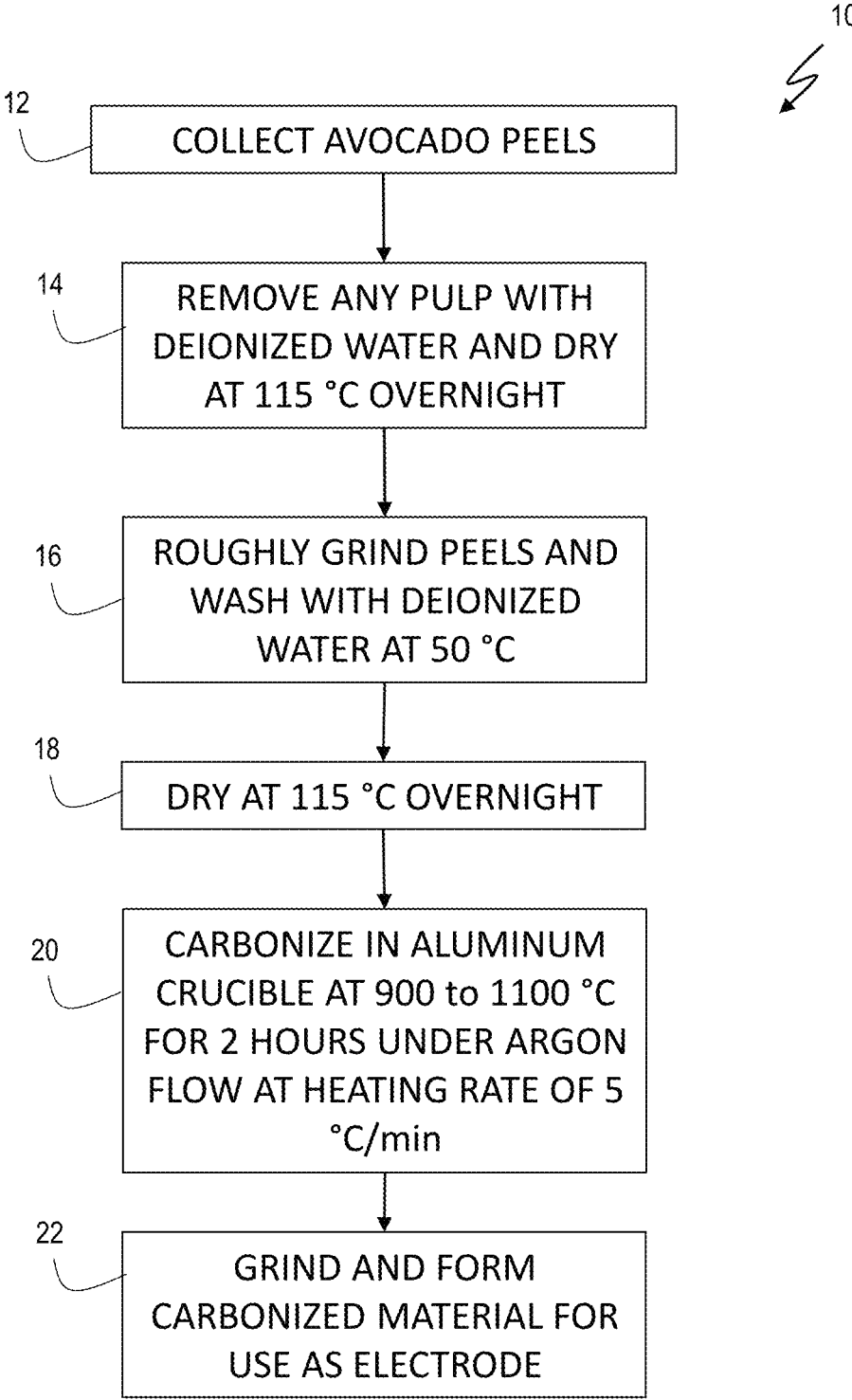
FIG. 1 is a schematic of the main steps according to the present invention to produce sodium batteries with hard carbon from avocado peels, which successfully operate as an anode in a sodium battery.

Referring to the figures, wherein like numerals refer to like parts throughout, there is seen in FIG. 1 a process 10 according to the present invention for converting avocado peels into a high purity and high quality hard carbon material with one of the highest conductivities for monovalent ions (Li+ and Na+) known to date. The high performance was achieved only through high temperature processing, although additional steps such as stringent washing, and mild acid or base treatments can further aid in advancing the carbon structure by increase its porosity, decreasing particle sized, as well as improving chemical reactivity and conductivity. It is believed that the avocado peels successfully served as a source material due to the specific lignin content. Accordingly, other biological materials, including waste products, with specific lignin content may also serve as acceptable starting point for forming high quality hard carbon material according to the present invention. Process 10 commences with the collection of avocado peels 12. Any pulp is then removed from the peels using deionized water and the peels are dried overnight at 115° C. overnight 14. The dried peels are then roughly ground and washed with water at 50° C. 16. The ground and washed peels are then dried overnight at 115° C. 18. The dried peels are then carbonized 20 in an aluminum crucible at 900 to 1100° C. for two hours under argon flow at a heating rate of 5° C./min. The resulting material may then be ground and formed for use as a hard carbon electrode 22.

EXAMPLE

Material Synthesis

Avocado peels were collected from the Syracuse University's Food Services and local markets. The excess pulp left in the peels was removed with tap water and then with deionized (D.I.) water at room temperature, with subsequent drying at 115° C. overnight. The peels were then roughly grounded, washed with warm D.I. water at 50° C. (500 mL for ~2.5 g of dried peels), and dried again at 115° C. overnight. The resulting solids were put in an alumina crucible and inserted in a Lindberg Blue M tube furnace to be carbonized at 900 or 1100° C. for 2 hours under Ar flow (200 sccm) with a heating rate of 5 C/min. The resulting hard carbons (labelled herein as HC-900 and HC-1100) were manually grounded using an agate mortar and pestle. From each 1 g of raw peels, 63.6 mg of hard carbon were obtained. FIG. 1 shows a schematic summarizing the hard carbon production towards its final use as an anode component of a battery.

Material Characterization

X-ray diffraction (XRD) measurements were collected on a Rigaku MiniFlex 600 diffractometer with Cu Kα radiation (λ=1.5405 Å). Raman spectroscopy was carried out on a Renishaw inVia confocal microscope using a 532 nm laser line and a scan time of 10 s per scan. 10 scans were collected to obtain each spectrum. N$_2$ (99.999%, Airgas) adsorption isotherm measurements were performed at 77K in a surface area and porosity analyzer (Micromeritics ASAP 2020). Total surface areas were determined by Brunauer-Emmett-Teller (BET) and t-plot micropore analyses. Pore volumes were characterized by nitrogen cumulation at a relative pressure of 0.995. Pore sizes were estimated by Barrett-Joyner-Halenda (BJH) analysis of the desorption branch of N$_2$ uptake isotherms. Scanning electron microscopy was carried out on a JEOL JSM100IT-LA SEM using an accelerating voltage of 10 kV. High magnification images and EDS maps were obtained using an accelerating voltage of 20 kV.

Electrochemical Characterization

The electrodes were prepared by mixing the hard carbon, super P (carbon black), and polyvinylidene fluoride (PVDF) at a weight ratio of 8:1:1 in N-Methyl-2-pyrrolidone (NMP) so that 1.5 mL of solvent was used for 0.5 g of solid mix. The slurry was sonicated and ball-milled repeatedly until homogeneity, and then casted onto copper foil and dried at 80° C. overnight. The loading mass of active material ranged from 0.86 to 1.02 mg/cm'. Sodium metal and Whatman GF/F microfiber filters were selected as counter electrode and separator, respectively. The electrolyte composition was 0.8 M NaClO$_4$ in ethylene carbonate (EC) and diethyl carbonate (DEC) at a 1:1 (v/v) with 5% v/v fluoroethylene carbonate (FEC) as an additive. The solvent solution was tested regarding water content prior to salt dissolution using a Karl-Fischer (KF) coulometer (Metrohm) titration system. The water concertation was measured to be ~4 ppm. CR2032 coin cells were assembled under argon in an MBraun glove box with moisture and oxygen levels below 0.5 ppm. Cyclic voltammetry measurements and electrochemical impedance spectroscopy (EIS) tests were recorded using a Solartron Energy Lab XM Instrument. Galvanostatic charge-discharge tests were performed on an Arbin LBT 8-channel Battery Tester within a potential window of 0.05 mV-2500 mV (vs. Na/Na⁺).

Hard Carbon Characterization

Figure 2:
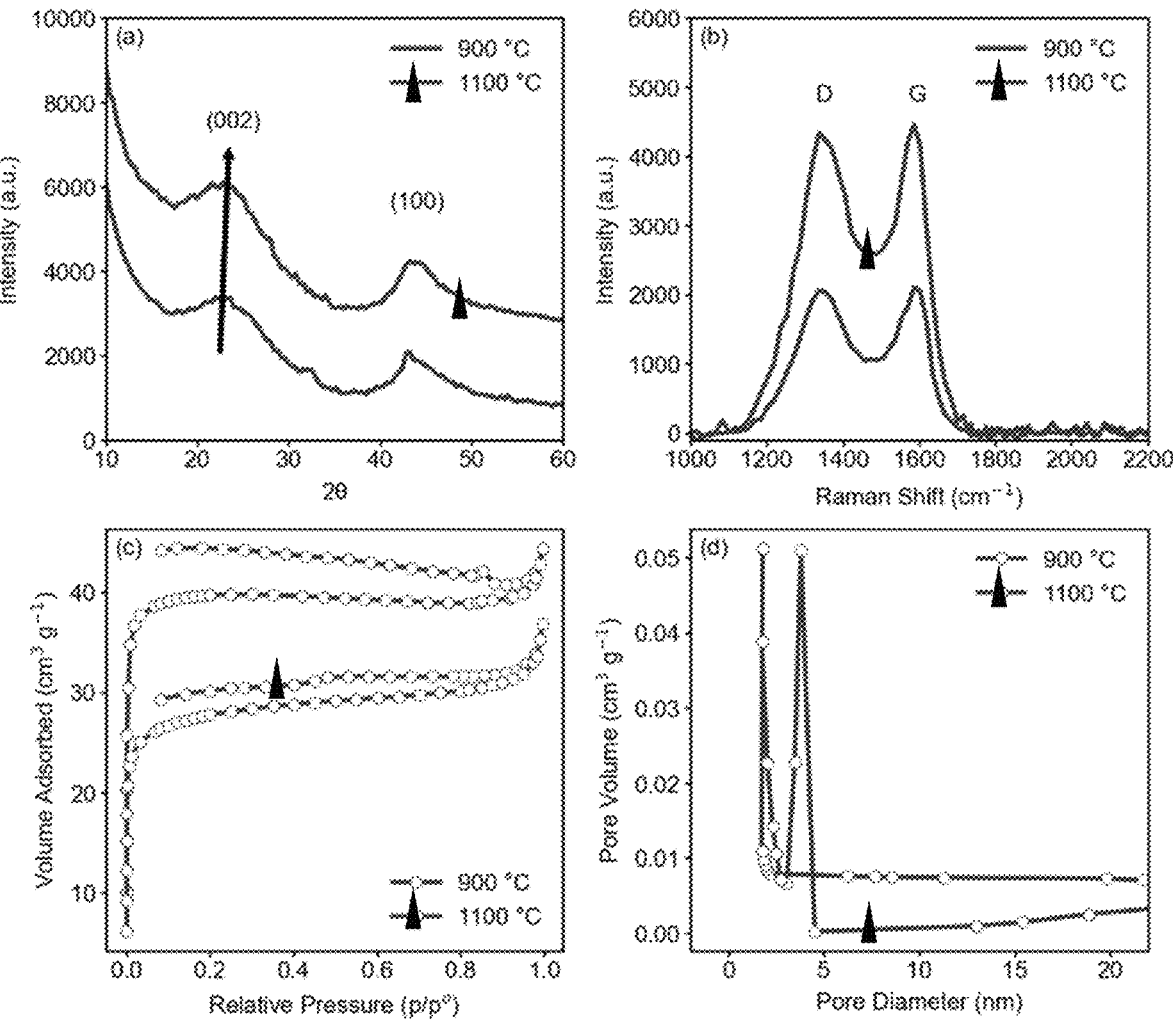
FIG. 2 is a series of graphs showing the characterization of avocado peel-derived hard carbon obtained at 900° C. (HC-900) and 1100° C. (HC-1100): (a) XRD; (b) Raman spectra; (c) Nitrogen adsorption—desorption isotherms; (d) Estimated pore size distribution.

The XRD spectra of hard carbon obtained at both temperatures are presented in FIG. 2($a$). The curves show broad peaks around 22° and 43°, which correspond to the (002) and (100) crystal planes, respectively. The absence of other phases of significant intensity indicate that the mild cleaning procedure with DI water sufficiently removed impurities that would otherwise remain after the sintering step. The difference between washed and unwashed samples can be closely verified, in which uncleaned avocado peels resulted in contaminated hard carbon. As indicated by the arrow in FIG. 2($a$), the diffraction peak of the (002) crystal plane shifted slightly to a higher angle, which signifies that the increase in temperature resulted in decreased spacing between the graphite layers, which has been observed by other hard carbon studies. This finding was confirmed by calculating sirable SEI. The average BJH pore size estimation was approximately 4.8 nm for both samples, which has the potential to contribute to sodium ion storage.

Figure 3:
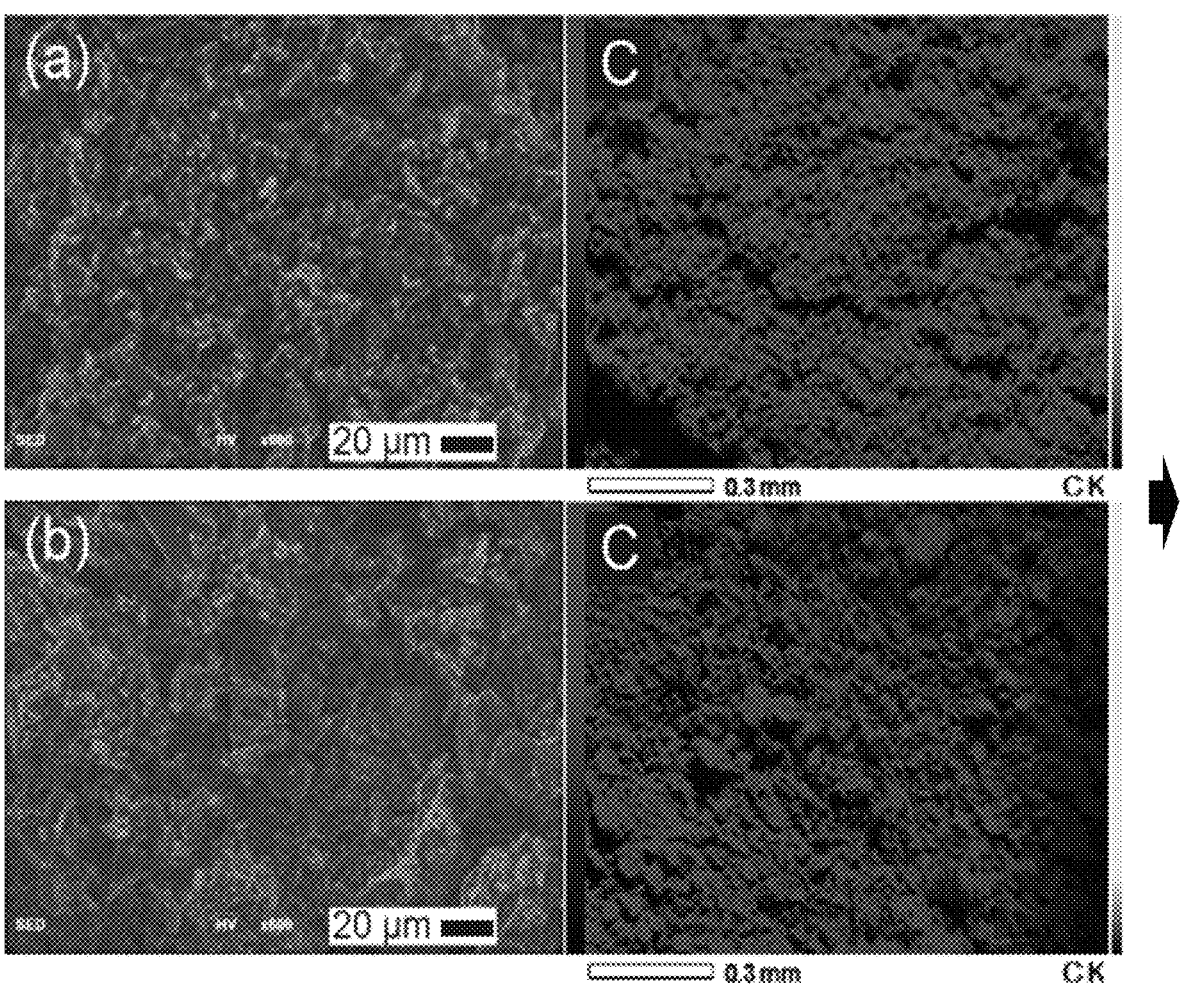
FIG. 3 is a series of SEM images and EDS mapping of (a) HC-900 and (b) HC-1100 with EDS maps of elements with most relevant atomic percentages.
Figure 3:
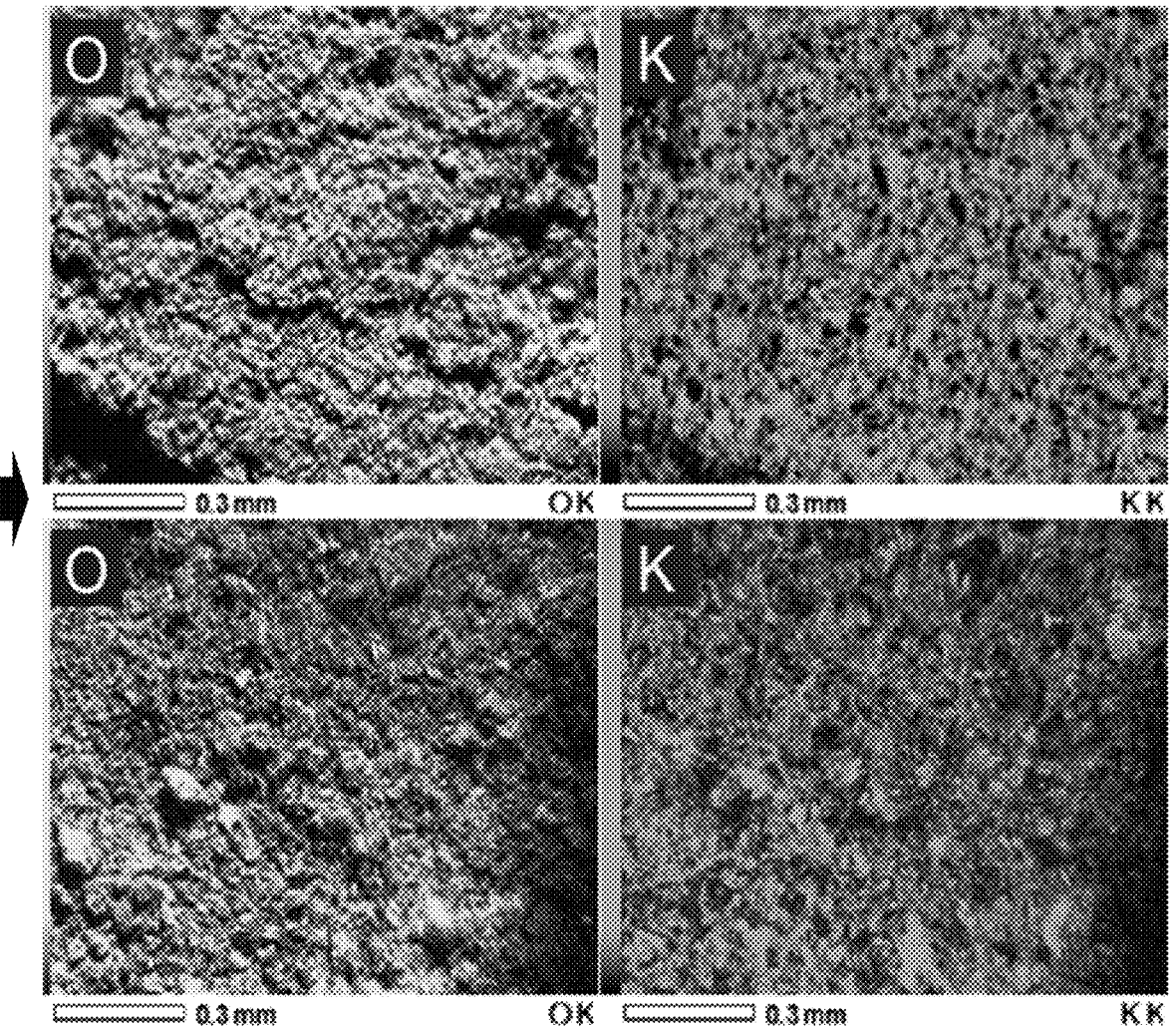

The morphology of HC-900 and HC-1100 is shown in FIGS. 3($a$) and ($b$), including EDX mappings for both samples. As seen in the SEM images, HC-900 has slightly smaller aggregates than HC-1100. This small variation could come from the manual grounding process. EDX mapping of the samples confirms their uniformity and high conversion into hard carbon. Other than carbon, oxygen and potassium are the next two major elements present in the hard carbons, which most likely originates from the organic compounds in avocado peels. Detailed percentages of these elements are displayed in Table 1, alongside other key material characterization data. As shown, the percentage of carbon in HC-1100 is greater than in HC-900, namely, 92.68% and 84.85%, respectively. The higher purity of HC-1100 was expected due to higher conversion temperatures leading to the removal of heteroatoms and complex functional groups. This result is consistent with the BET surface area, and indicates that HC-1100 could be more suitable for electrode applications.

TABLE 1

Summary of major material characterization results
of avocado peel-derived HC-900 and HC-1100

| Sample | XRD $d_{002}$ (Å) | Raman $I_D/I_G$ | BET and BJH Analysis | | | EDS Atomic Percentages (%) | | |
|---|---|---|---|---|---|---|---|---|
| | | | Surface Area $(m^2 \, g^{-1})$ | Pore Size (nm) $d_{abs}$ | $d_{des}$ | C | O | K |
| HC-900 | 4.07 | 0.97 | 126.03 | 5.80 | 3.82 | 84.85 | 14.06 | 0.51 |
| HC-1100 | 3.95 | 0.96 | 89.79 | 4.92 | 4.57 | 92.68 | 6.545 | 0.33 |

$d_{002}$ with the Bragg formula. HC-900 and HC-1100 showed graphene interlayer distances of 4.07 and 3.95 Å, respectively, both greater than the minimum interlayer space of 3.7 Å necessary for Na⁺ insertion in carbon-based materials.

Raman spectroscopy was used to further elucidate the disordered nature of the hard carbon, and results are displayed in FIG. 2($b$). Both samples showed the two characteristic peaks for carbon-based materials: a D-band peak at approximately 1350 cm⁻¹ that corresponds proportionally to the carbon disorderliness and defect presence; and a G-band peak at ~1589 cm⁻¹, a crystalline graphite band. The intensity of each peak informs the material's degree of graphitization. The ratio between the D-band and G-band intensities ($I_D/I_G$) was calculated for HC-900 and HC-1100 and found to be 0.97 and 0.96, respectively. Such lower $I_D/I_G$ ratios indicate higher degrees of graphitization, which has been shown to reduce the irreversible capacity in the first cycle. The slight decrease in defects observed at 1100° C. is expected as higher temperatures can promote graphitization.

FIGS. 2($c$) and ($d$) show the nitrogen adsorption-desorption isotherms and the estimation of pore size distributions by the Barrett-Joyner-Halenda (BJH) method of the hard carbon samples, respectively. The BET surface area of both samples was 126.03 m²/g for HC-900 and 89.79 m²/g for HC-1100. This decrease in surface area proportional to the pyrolyzation temperature can be explained by the closuring effect of early stage rising carbonization temperature on micropores. Hard carbons with lower surface areas have demonstrated higher initial Coulomb efficiency (% ICE) and improved reversible capacities by side reactions and unde- Electrochemical Properties of Avocarbon Anodes The electrochemical behaviors of HC-900 and HC-1100 anodes were firstly characterized by cyclic voltammetry tests using standard CR2032 coin cells. FIGS. 4 ($a$) and ($b$) show the first three cycles within an electrochemical window of 0.05 mV to 2.5 V at a sweep rate of 0.25 mV/s. The first discharge curve of both cells shows a small cathodic peak at ~0.5 V that vanishes on subsequent cycles. This cathodic phenomenon can be attributed to irreversible electrolyte breakdown for form the solid electrolyte interphase (SEI) layer. Around 0.01 V, a sharp cathodic peak is observed, which is assigned to Na⁺ intercalation in the graphitic microcrystallites. The anodic peaks at 0.2-0.5 V indicate the extraction of sodium ions from the graphite layers. A broad redox region ranging from 0.25 to 1.5 V corresponds to the adsorption process of Na⁺ on the hard carbon surface. In the HC-900 CV curves, the anodic peaks are almost completely merged to the adsorption slopes, indicating that Na⁺ extraction was less efficient in this sample. This is confirmed by the decrease in intensity of the redox peaks in the subsequent cycles, which corresponds to a reduced concentration of sodium ion in the electrolyte and empty interlayer spaces. This observation can be explained by the lower carbonization temperature leading to higher surface areas and, consequently, increased side reactions. After the initial cycle, the HC-1100 almost completely overlap, indicating excellent insertion-extraction reversibility and suggesting that an 1100° C. pyrolyzation temperature is high enough to produce suitable hard carbon from avocado peels. Moreover, weak cathodic peaks can be observed in the 0.5-1.0 V potential region, which corresponds to reversable surface/porosity insertion mechanisms in the HC-1100 electrodes.

The initial galvanostatic charge-discharge profiles for HC-900 and HC-1100 at 0.05 A/g are presented in FIGS. 4(c) and (d). The first discharge specific capacities for HC-900 and HC-1100 were, respectively, 269.79 and 500.65 mAh/g, and ICE were 59.10% and 60.78%. The low ICE, as well as the drop in discharge capacity of the second cycle, can be explained by the irreversible electrolyte decomposition and SEI formation, which is consistent with CV results. Similarly, the first slope observed in the initial discharge profile disappears in the next two discharge curves and can also be assigned to SEI formation. The two subsequent reversible regions are fundamental to the sodium ion storage mechanism. The slope area is commonly attributed to the absorption of Na$^+$ in the hard carbon surface and porosity, while the plateau region corresponds to the intercalation process of Na$^+$, confirming the CV results. As clearly seen, HC-1100 delivered a higher capacity and ICE than HC-900, as expected from the BET results. The results in FIGS. 4(c) and (d) also indicate a reversible capacity of 150.06 and 352.55 mAh/g for HC-900 and HC-1100, respectively, both with Coulombic efficiency above 96%. Due to the higher reversible capacity and better overall characteristics, further cycling studies were conducted only with hard carbon obtained at 1100° C. (HC-1100).

FIG. 5 shows the cycling performance of the hard carbon electrode. The first 50 cycles obtained at a 0.05 A/g rate are presented in FIG. 5 (a). The expected capacity drop from the first to the second cycle was followed by a considerable increasing trend until cycle 5, increasing from 336.18 to 370.22 mAh/g. This result implies an activation process that occurs during the first cycles and could be related to an interlayer rearrangement that provided new Na$^+$ storage sites. Alternatively, this initial increase in rate capacity could also be caused by a slower wetting process of the electrode with electrolyte. Overall, the cells showed a stable discharge capacity of ~320 mAh/g, with capacity retention of 93.63% (with respect to the 2$^{nd}$ cycle) and Coulombic efficiency of 99.60% after all 50 cycles. FIG. 5 (b) shows the 2$^{nd}$, 35$^{th}$, and 50$^{th}$ cycling profiles from the same galvanostatic study shown in FIG. 5 (a). As can be clearly seen, the discharge curves almost completely overlap, further confirming the high reversibility of Na$^+$ intercalation in our avocado-derived hard carbon. The rate performance was evaluated at different current densities (FIG. 5 (c)). During the entire experiment, the CE remained above 94% with a final value of 98.12%. From the initial discharge capacity at 0.05 A/g to the last capacity at a 3.5 A/g rate, the retention was 26.02%. The stable capacity at such a high rate indicates optimal conductivity of the studied hard carbon. To further investigate the cyclic stability at 3.5 A/g, a cell was cycled 500 times at this rate, and cycling results are presented in FIG. 5(d). The capacity was stable at ~86 mAh/g, with a 99.91% CE was maintained after 500 cycles. The steady increase of capacity after the first drops was also observed, indicating the presence of a similar activation process at higher current densities. This observation coupled with the low ICE of 29.44% indicates that further improvements to prevent irreversible capacities can benefit initial cycling at higher rates. In that sense, EIS impedance measurements were collected after the first cycle and after 50 cycles at 1 A/g (FIG. S2). From the impedance fittings, the SEI resistance (R$_{SEI}$) decreased from 181.08 to 82.10Ω after cycling, indicating that the SEI films successfully stabilized the electrodes and contributed to longer cycling stabilities.

Sodium Ion Diffusion Kinetics

The reaction kinetics of the HC-1100 electrode were also evaluated by cyclic voltammetry tests under sweeping rates from 0.25 mV s$^{-1}$ to 1.0 mV s$^{-1}$ with a voltage window from 0.05 mV to 2.5 V. The results are present in FIG. 6(a). The redox peaks hardly shifted with the increased scanning rates, which indicates small polarization of the (de)intercalation process. The increase in cathodic and anodic current peaks (in) with higher scan rates can inform about the diffusion process in the electrode. The square root of the scanning rate (v$^{1/2}$) linearly relates to i$_p$ according to the Randles-Sevcik relationship described in the following equation $$i_p = 2.687 \times 10^5 n^{1/2} v^{1/2} D^{1/2} AC \tag{1}$$

where n is the number of transferring electrons (n=1 for sodium), D is the diffusion coefficient, A is the electrode area, and C is the concentration of Na$^+$. The average Na$^+$ diffusion coefficient was $8.62 \times 10^{-8}$ cm$^2$ s$^{-1}$, which is superior to several recent hard carbon reports and comparable to pre-oxidated coal based hard carbon. The fast Na$^+$ diffusion is likely due to the enlarge interlayer spacing (0.395 nm), which reduced the ion diffusion resistance and enhanced the sodium-ion insertion capacity.

To further elucidate the kinetic mechanisms in the hard carbon electrode, we plotted the logarithm of the cathodic current peaks versus the logarithm of the sweep rates, and results are available in FIG. 6(b). Current and sweep rate obey the power law relationship:

$$i_p = a v^b \tag{2}$$

where a and b are constants that can be found through linearization. The b-value can inform whether the storage mechanism can be classified as purely capacitive (surface-controlled) if b=1, or as diffusion-limited (charge intercalation behavior) if b=<0.5. If the b-value is between 0.5 and 1, both mechanisms contribute to the storage process. The hard carbon in this study showed a b-value of 0.342, which suggests that Na$^+$ intercalation was the main storage mechanism in a diffusion-controlled process.

When compared with reported hard carbons that did not undergo any acidic or alkaline activation, nor any doping, the untreated hard carbon presented in this work demonstrated superior reversible capacities and rate performance. Beda et. al. evaluated the effect of natural impurities in biomass-derived hard carbon as anode materials. The maximum capacity achieved was 214 mAh/g at a rate of 37.2 mA/g for untreated hard carbon carbonized at 1300° C. Similarly, Alvin et. al. reported reversible capacity of 231 mAh/g at a 50 mA/g rate from commercial microcrystalline cellulose powder carbonized at 1300° C., which demonstrates that our method leaded to better performance with less energetic cost.

In summary, the present invention has produced high performance hard carbon from avocado peels via a simple and inexpensive route. No pretreatment, activation, or chemical washing methods were necessary to produce hard carbon at 1100° C. with 92.68 at % of carbon, suitable mesoporosity, and interlayer spacing above the necessary for sodium intercalation (>3.7 Å). Electrochemical measurements confirmed the applicability of avocado-derived hard carbon as electrode active materials, with high reversible capacities of 320 mAh/g over 50 cycles at 50 mA/g, good rate performance of 86 mAh/g at 3500 mA/g, and Coulombic efficiencies above 99.9% after 500 cycles. CV measurements suggest superior Na$^+$ diffusion in the HC-1100 electrodes, with (de)intercalation mechanisms as the main storage process. The present invention thus provides a facile, greener, and low-cost route to produce hard carbon from avocado peels, an abundant source that yields a promising anode material for high-rate performance sodium-ion batteries.

What is claimed is:

1. A method of producing hard carbon, comprising the steps of:

providing an amount of avocado peels;

carbonizing the amount of avocado peels at a temperature of at least 900 degrees Celsius for two hours under an argon gas flow at a heating rate of 5 degrees Celsius per minute; and grinding the amount of avocado peels after carbonizing to provide an amount of hard carbon.

2. The method of claim 1, wherein the temperature is 1100 degrees Celsius.

3. The method of claim 2, further comprising the step of removing any pulp from the amount of avocado peels prior to the step of carbonizing the amount of avocado peels.

4. The method of claim 3, further comprising the step of drying the amount of avocado peels at 115 degrees Celsius after the step of removing any pulp from the amount of avocado peels.

5. The method of claim 4, further comprising the step of grinding the amount of avocado peels after the step of drying the amount of avocado peels at 115 degrees Celsius.

6. The method of claim 5, further comprising the step of washing the amount of avocado peels with deionized water after the steps of grinding the amount of avocado peels and drying the amount of avocado peels at 115 degrees Celsius.

7. The method of claim 6, further comprising the step of drying the amount of avocado peels at 115 degrees Celsius after the step of washing the amount of avocado peels with deionized water after the steps of grinding the amount of avocado peels and drying the amount of avocado peels at 115 degrees Celsius.

8. The method of claim 7, further comprising the step of forming the amount of hard carbon into an electrode.

9. The method of claim 8, wherein the electrode is characterized by a reversible capacity of 352.55 mAh/g at 0.05 A/g.

10. The method of claim 8, wherein the electrode is characterized by a rate capability of 86 mAh/g at 3500 mA/g.

11. The method of claim 8, wherein the electrode is characterized by a 99.9% Coulombic efficiency after 500 cycles.

12. A hard carbon material, comprising an amount of carbonized avocado peels, wherein the hard carbon material has a graphene interlayer distance greater than 3.7 Å.

13. The hard carbon material of claim 12, wherein the hard carbon material has a graphene interlayer distance between 3.95 and 4.07 Å.

14. The hard carbon material of claim 12, wherein the hard carbon material has a carbon percentage between 84.85 percent and 92.68 percent.

15. The hard carbon material of claim 12, wherein the hard carbon material has a reversible capacity of 352.55 mAh/g at 0.05 A/g when provided as an electrode.

16. The hard carbon material of claim 12, wherein the hard carbon material has a rate capability of 86 mAh/g at 3500 mA/g when provided as an electrode.

17. The hard carbon material of claim 12, wherein the hard carbon material has a 99.9% Coulombic efficiency after 500 cycles when provided as an electrode.

* * * * *